United States Patent
Tankersley

(10) Patent No.: US 6,721,978 B1
(45) Date of Patent: Apr. 20, 2004

(54) HEAD BED

(76) Inventor: Harry Tankersley, 2111 N. 43rd Ave., Hollywood, FL (US) 33021-4240

( * ) Notice: Subject to any disclaimer, the term of this patent is extended or adjusted under 35 U.S.C. 154(b) by 0 days.

(21) Appl. No.: 10/341,273

(22) Filed: Jan. 14, 2003

(51) Int. Cl.[7] ............................................... A47G 9/00
(52) U.S. Cl. .................. 5/652; 5/632; 5/638; 297/391; 297/392
(58) Field of Search ..................... 5/632, 652, 638, 5/652.1; 297/391, 392

(56) References Cited

U.S. PATENT DOCUMENTS

| | | | |
|---|---|---|---|
| 1,542,674 A | * 6/1925 | Darling | 5/632 |
| 2,803,022 A | * 8/1957 | Wynkoop | 5/638 |
| 3,315,282 A | 4/1967 | Lowery et al. | |
| 4,235,472 A | 11/1980 | Sparks et al. | |
| 5,675,851 A | * 10/1997 | Feathers | 5/632 |
| 6,042,185 A | 3/2000 | Cowgur | |
| 6,081,947 A | * 7/2000 | Disher | 5/632 |
| 6,374,441 B1 | * 4/2002 | Begell | 5/636 |
| 6,412,127 B1 | * 7/2002 | Cuddy | 5/632 |
| 2002/0184706 A1 | * 12/2002 | Riach | 5/632 |

FOREIGN PATENT DOCUMENTS

FR         2261729 A    *  9/1975   ..................... 5/632

* cited by examiner

Primary Examiner—Alexander Grosz
(74) Attorney, Agent, or Firm—Oltman, Flynn & Kubler

(57) ABSTRACT

A head bed having a head cushion adapted to extend in an inclined position on the upwardly-facing top surface of a support adjacent an edge of the support, and an upper torso cushion adapted to hang down across the edge of the support.

9 Claims, 5 Drawing Sheets

HEAD BED

BACKGROUND OF THE INVENTION

1. Field of the Invention

This invention relates to device on which a sitting person can rest his or her head to sleep or just take a rest.

2. Prior Art

Various head rests have been proposed heretofore for use by a person in a sitting position.

For example, U.S. Pat. No. 3,315,282 to Lowery et al discloses a trapezoidal headrest pillow with an inclined top face on which a person can rest his or her head on the border of a central opening in the pillow. Other head rests for the same general purpose are shown in Cowgur U.S. Pat. No. 6,042,185 (a lap-supported inflatable pillow) and Sparks et al U.S. Pat. No. 4,235,472 (lap-supported, stacked, pillow-like components).

SUMMARY OF THE INVENTION

The present invention is directed to a novel head bed, for use by a person seated next to a support, that provides both a cushion for a person's head and a cushion for the region of the person's body just below the neck (hereinafter referred to as the "upper torso.")

A principal object of this invention is to provide a novel and advantageous portable head bed that provides a more complete and comfortable cushioning arrangement for person sitting next to a support, such as a table or desk, or steering wheel of a vehicle with a head cushion of the head bed positioned on an upwardly-facing top surface of the support, and an upper torso cushion hanging down across the edge of the support.

Further objects and advantages of this invention will be apparent from the following detailed description of a presently preferred embodiment thereof, with reference to the accompanying drawings.

DETAILED DESCRIPTION OF THE INVENTION

Before explaining the present invention in detail it is to be understood that the invention is not limited in its application to the particular arrangement shown and described since the invention is capable of other embodiments. Also, the terminology used herein is for the purpose of description and not of limitation.

Figure 2:
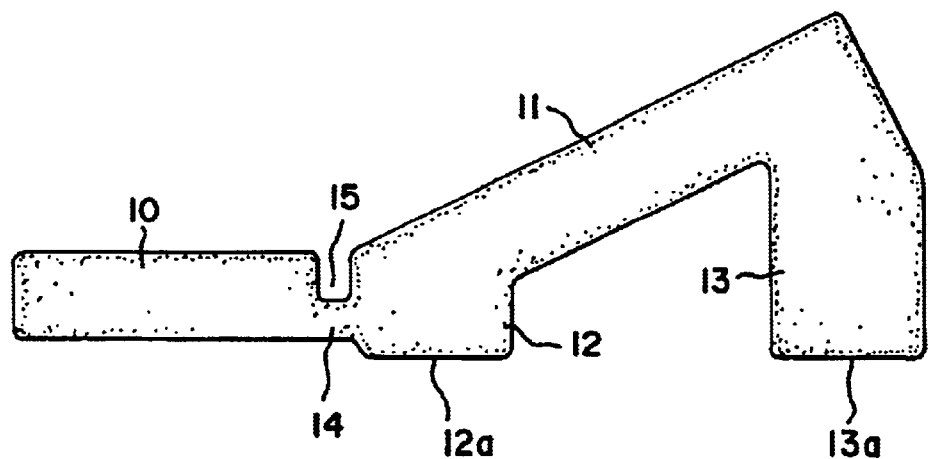
FIG. 2 is a side elevation of this head bed taken from the lower side of FIG. 1.
Figure 4:
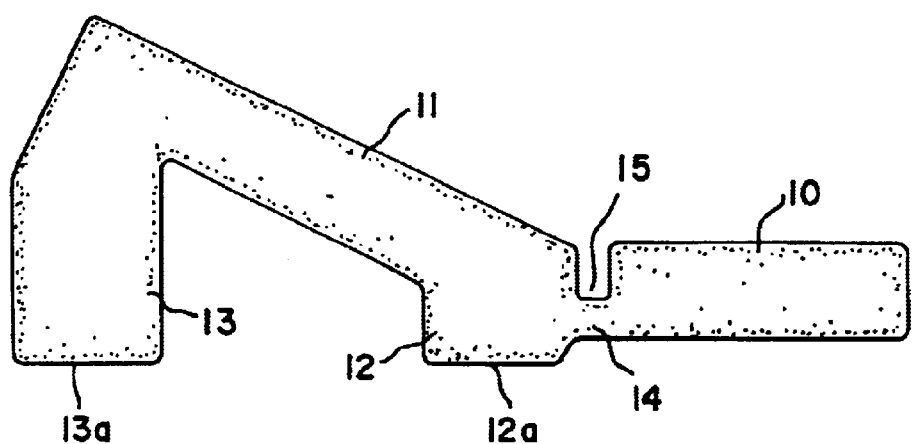
FIG. 4 is a side elevation of this head bed taken from the upper side of FIG. 1.
Figure 6:
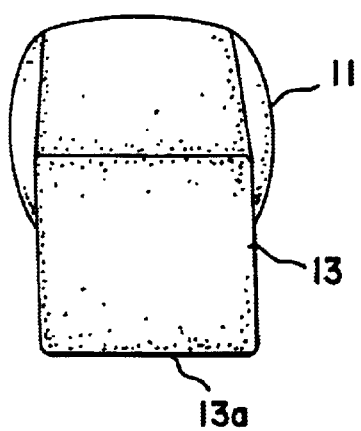
FIG. 6 is an end view taken from the right end of FIG. 1.

As best seen in FIGS. 2 and 4, the head bed of the present invention comprises: an upper torso cushion in the form of a generally flat, elongated lower segment 10; a head cushion in the form of a slightly longer face-engaging segment 11 that inclines upward from the lower segment 10; a vertically short front platform segment 12 below the lower end of the head cushion 11; and a higher rear platform segment 13 below the upper end of the head cushion 11; and flexible, readily bendable, vertically thinner, connecting segment 14 joining the upper torso cushion 10 of the head bed to the lower end of its head cushion 11. The head bed presents a transverse groove or channel 15 above the flexible connecting segment 14.

Platform segments 12 and 13 have respective flat bottom faces 12a and 13a which are substantially coplanar with one another for engagement with the upwardly-facing top surface of support, such as a table or desk. The top surface of the support preferably is horizontal, as shown for the table top T in FIG. 7, but it may be inclined, also, as in the case of a car or truck steering wheel.

Figure 1:
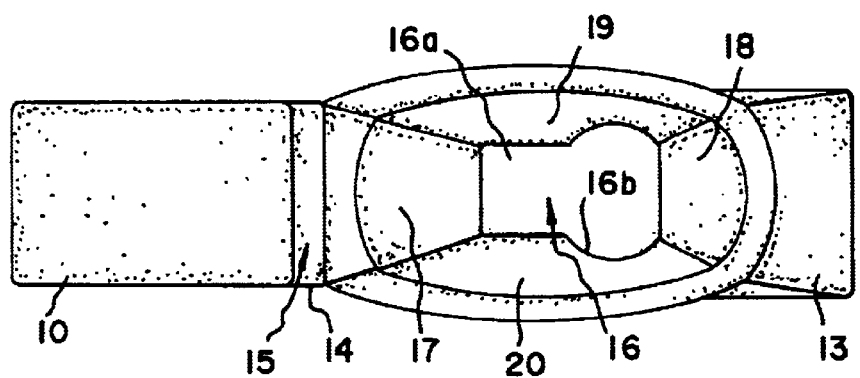
FIG. 1 is a top plan view of a head bed in accordance with a preferred embodiment of this invention.
Figure 3:
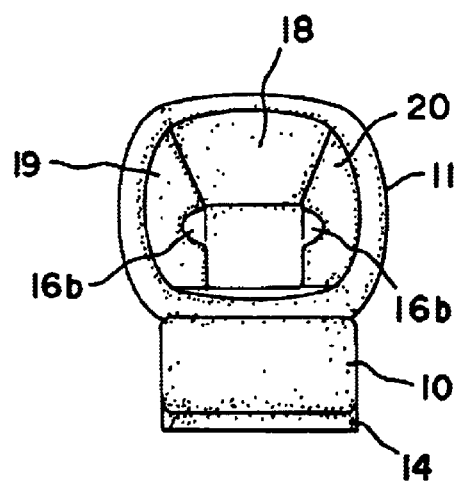
FIG. 3 is an end view taken from the left end of FIG. 1.
Figure 5:
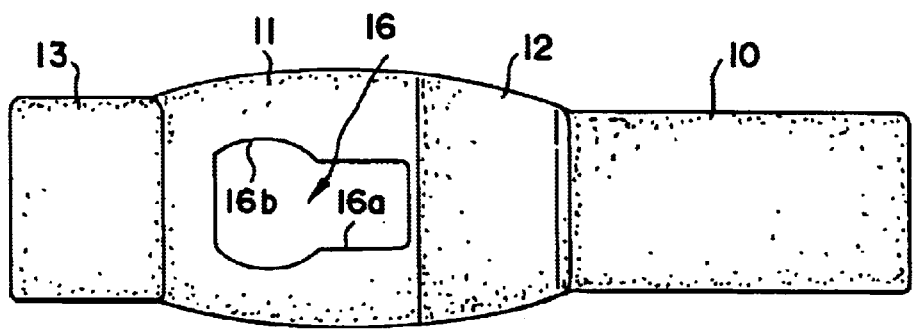
FIG. 5 is a bottom plan view of the head bed.

The head cushion 11 is formed with a large, generally keyhole-shaped, face opening 16 (FIGS. 1 and 5) that has a rectangular portion 16a at its lower end and a wider truncated circular portion 16b at its upper end. Opening 16 is shaped and dimensioned to receive most of a person's face, including the mouth, nose and eyes, so that the person can rest his or her head face-down on the head cushion 11 without feeling nervous or apprehensive. This opening extends from top to bottom all the way through the head cushion 11, and throughout its entire extent the head cushion 11 is spaced above the table top or other support surface so that the person can breathe freely at the face opening 16. The face opening is bounded by: a downwardly and inwardly inclined surface 17 at its lower end for supporting a person's head just below the mouth and at the chin; a downwardly and inwardly inclined surface 18 at its upper end for supporting the person's forehead; and respective downwardly and inwardly inclined surfaces 19 and 20 along its opposite sides for supporting the respective cheek and temple areas of the person's head. These sloping surfaces 17–20 comfortably support the person's head at the chin, forehead, and along opposite sides of the face.

Figure 7:
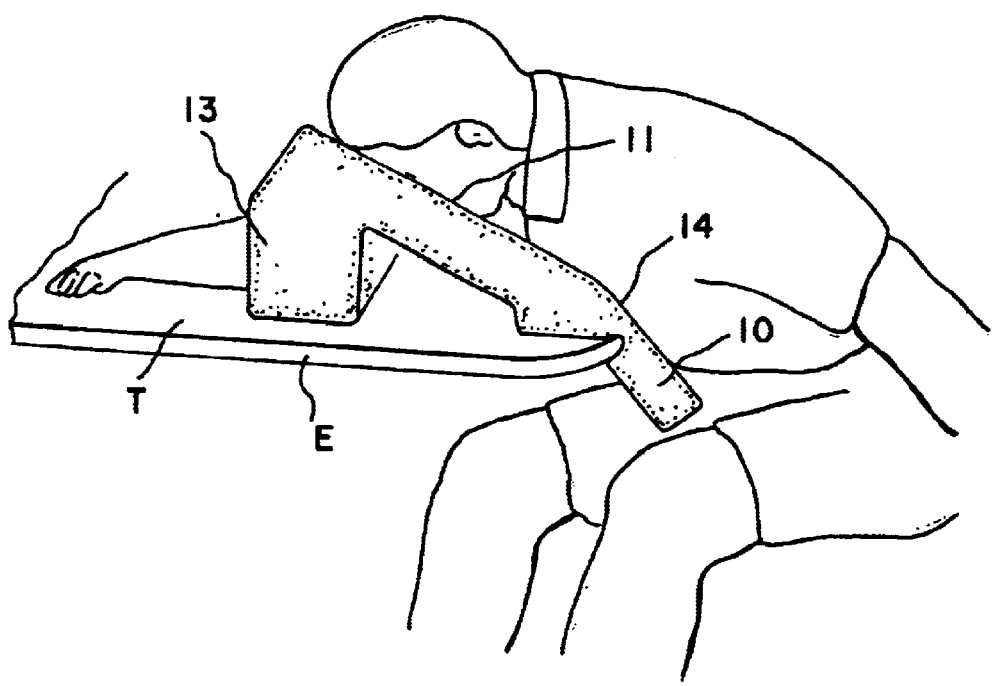
FIG. 7 is a perspective view of a man resting his head and upper torso against the present head bed positioned on a table top.

As shown in FIG. 7, the head bed can bend readily at its vertically thinner connecting segment 14 so that its elongated front segment 10 provides a cushion for the person's collarbone (clavicle) and the upper part of his or her breastbone (the manubrium of the sternum). This greatly enhances the user's comfort by providing a cushioning support not only for the head but also for the upper part of the torso, which otherwise might engage the top corner between the table top T or other support and its peripheral edge E.

To give it the desired combination of structural firmness and compressible softness for comfortable cushioning support of the person's head and the upper part of his or her torso, the present head bed may be made of various suitable materials or combinations of them, such as polystyrene foam, foam rubber, or an envelope filled with a suitable gel, air, carbon dioxide, water, or other appropriate substance. The support platforms 12 and 13 may be of firmer construction than the parts of the head bed that engage the person (i.e., the inclined head cushion 11 and the depending upper torso cushion 10).

The various parts of this head bed are dimensioned to serve their respective functions when used as shown in FIG. 7, for example. In one practical embodiment the upper torso cushion 10 is about 9 or 10 inches long and about 7 or 8 inches wide, and the head cushion 11 is the same width and slightly longer than the upper torso cushion 10.

If desired, the platform segment 13 at the upper end of the head cushion 11 of the head bed may be omitted, in which case the user will place a separate support device under this end to give it the desired elevation above the table top or other support surface.

Also, although the integral construction of the head bed disclosed herein is preferred, the flexible connection between the head cushion 11 and the upper torso cushion 10 may be made detachable from one or the other, if desired, for more compact storage of the head bed when not in use.

From the foregoing description and the accompanying drawings, it will be evident that the present head bed is a conveniently portable device that may be placed on any horizontal or inclined upwardly-facing support surface, such as a table top or desk top, to cushion both the upper torso and the head of a person sitting next to the support surface, thereby giving the person a more complete and more comfortable positioning arrangement for resting or sleeping.

I claim:

1. A portable head bed for use by a seated user, on an upwardly-facing top surface of a support that has a peripheral edge around said top surface, comprising: a head cushion adapted to be placed on said top surface of the support and shaped and dimensioned for overlying engagement by a seated person's head; an upper torso cushion shaped and dimensioned for engagement by said seated person at the clavical and the upper part of the thorax; and means providing a flexible readily bondable connection of said upper torso cushion to said head cushion which enables said upper torso cushion to hang down across said edge of the support; and further comprising: means for positioning said head cushion on said top surface of the support inclining upward away from said edge of the support.

2. A head bed according to claim 1, wherein said means for positioning said head cushion comprises: a platform segment extending down from said head cushion away from said flexible connection to rest on said top surface of the support away from said edge thereof.

3. A head bed according to claim 1, wherein said head cushion is formed with a large face opening extending down from the top of the head cushion and positioned and dimensioned to accommodate the mouth, nose and eyes of a person resting his or her head face-down on said head cushion.

4. A head bed according to claim 3, wherein said means for positioning said head cushion comprises: a front platform segment extending down from said head cushion adjacent said flexible connection; and a rear platform segment extending down from said head cushion at the opposite end of said opening therein from said connecting segment, said rear platform segment being substantially taller than said front platform segment.

5. A head bed according to claim 3, wherein said face opening extends from top to bottom completely through said head cushion, and said means providing said flexible connection is a wide, vertically thinner segment of the head bed integrally joined to said head cushion and to said upper torso cushion.

6. A head bed according to claim 1, wherein said means providing said flexible connection is a vertically thinner segment of the head bed integrally joined to said head cushion and to said upper torso cushion.

7. A head bed according to claim 1, wherein said means providing said flexible connection is a vertically thinner segment of the head bed integrally joined to said head cushion and to said upper torso cushion.

8. A portable head bed adapted to support the head and upper torso of the seated user to be positioned on an upwardly-facing top surface of a support having a peripheral edge around said top surface, comprising: a head cushion adapted to be placed on said top surface of the support adjacent said edge and shaped and dimensioned for overlying engagement by a person's head, said head cushion being formed with a large face opening extending from top to bottom completely through the head cushion and positioned and dimensioned to accommodate the mouth, nose and eyes of a person resting his or her head face-down on said head cushion; means for positioning said head cushion on said top surface of the support inclining upward away from said edge of the support and spaced above said top surface of the support over substantially the entire extent of said opening; an upper torso cushion shaped and dimensioned for engagement by said seated person at the clavicle and the upper part of the thorax; and a readily bendable connecting segment integrally joining said upper torso cushion to the lower end of said head cushion and enabling said upper torso cushion to hang down across said edge of the support.

9. A head bed according to claim 8, wherein said means for positioning said head cushion comprises: a front platform segment extending down from the head cushion adjacent said connecting segment, and a taller rear platform segment extending down from said head cushion at the opposite end of said face opening from said connecting segment, said platform segments positioning the bottom of the head cushion spaced above said top surface of the support over substantially the complete extent of said face opening.

* * * * *